United States Patent
Voleti et al.

(10) Patent No.: US 10,686,711 B2
(45) Date of Patent: Jun. 16, 2020

(54) ENHANCED QUALITY OF SERVICE MANAGEMENT FOR INTER-COMPUTING SYSTEM COMMUNICATION

(71) Applicant: ColorTokens, Inc., Santa Clara, CA (US)

(72) Inventors: Ravi Voleti, Fremont, CA (US); Harish Magganmane, San Jose, CA (US); Ashish Trivedi, Fremont, CA (US); Deepak Mohanty, Fremont, CA (US); Anoop Kapoor, San Jose, CA (US); Pankaj Parekh, Santa Clara, CA (US); Naveen Kulshreshtha, San Ramon, CA (US)

(73) Assignee: COLORTOKENS, INC., CA (US)

( * ) Notice: Subject to any disclaimer, the term of this patent is extended or adjusted under 35 U.S.C. 154(b) by 127 days.

(21) Appl. No.: 15/793,396

(22) Filed: Oct. 25, 2017

(65) Prior Publication Data

US 2019/0124011 A1   Apr. 25, 2019

(51) Int. Cl.
| H04L 12/851 | (2013.01) |
| H04L 12/24 | (2006.01) |
| H04L 12/46 | (2006.01) |
| H04L 29/06 | (2006.01) |
| H04L 12/721 | (2013.01) |
| H04L 12/707 | (2013.01) |
| H04L 29/08 | (2006.01) |

(52) U.S. Cl.
CPC ......... *H04L 47/24* (2013.01); *H04L 12/4633* (2013.01); *H04L 12/4641* (2013.01); *H04L 41/0896* (2013.01); *H04L 41/5003* (2013.01); *H04L 63/0428* (2013.01); *H04L 63/104* (2013.01); *H04L 45/24* (2013.01); *H04L 45/38* (2013.01); *H04L 67/1044* (2013.01)

(58) Field of Classification Search
None
See application file for complete search history.

(56) References Cited

U.S. PATENT DOCUMENTS

| 6,359,884 B1 * | 3/2002 | Vincent ............... H04L 47/10 370/389 |
| 6,898,641 B1 * | 5/2005 | Kobayashi ........... H04L 45/00 709/238 |

(Continued)

*Primary Examiner* — Ajit Patel
*Assistant Examiner* — Richard Schnell
(74) *Attorney, Agent, or Firm* — Barry Choobin; Patent 360 LLC (57) ABSTRACT

Described herein are systems, methods, and software to enhance secure communications between computing systems. In one implementation, a communication service identifies a communication request from an application on the computing system to transfer data to a second application on a second computing system. In response to the communication request, the communication service identifies a communication group of a plurality of communication groups associated with the application and the second application. Once the communication group is identified, the communication service identifies a communication quality of service based on the identified communication group, and transfers the data associated with the communication request to the second computing system in accordance with the communication quality of service.

15 Claims, 7 Drawing Sheets

(56) References Cited

U.S. PATENT DOCUMENTS

| | | | |
|---|---|---|---|
| 7,434,255 B2* | 10/2008 | Akimoto | H04L 63/0236 |
| | | | 726/13 |
| 10,212,089 B1* | 2/2019 | Narayanan | H04L 47/125 |
| 2003/0233452 A1* | 12/2003 | Maufer | H04L 29/12018 |
| | | | 709/225 |
| 2005/0088968 A1* | 4/2005 | Lauer | H04W 28/22 |
| | | | 370/229 |
| 2007/0274230 A1* | 11/2007 | Werber | H04L 41/082 |
| | | | 370/254 |
| 2008/0065890 A1* | 3/2008 | Lundsgaard | H04L 63/164 |
| | | | 713/171 |
| 2010/0257365 A1* | 10/2010 | Anchan | H04L 63/068 |
| | | | 713/171 |
| 2010/0262632 A1* | 10/2010 | Jain | G06F 16/258 |
| | | | 707/809 |
| 2015/0156780 A1* | 6/2015 | Kim | H04L 5/0035 |
| | | | 370/331 |

* cited by examiner

| COMMUNICATION GROUP 410 | QUALITY OF SERVICE PARAMETERS 420 |
|---|---|
| GROUP 440 | QOS PARAMETERS 450 |
| GROUP 441 | QOS PARAMETERS 451 |
| GROUP 442 | QOS PARAMETERS 452 |
| GROUP 443 | QOS PARAMETERS 453 |

ENHANCED QUALITY OF SERVICE MANAGEMENT FOR INTER-COMPUTING SYSTEM COMMUNICATION

BACKGROUND

In computing networks, computing systems, both real and virtual, often include applications and services that require communications with other computing systems to provide desired operations. For example, an application on a first computing system may require data from a database located on a second computing system. Consequently, to provide the communication, the data payload may be placed in a network packet, and transferred to the required computing system. However, although network packets provide a method of communication between computing systems, difficulties often arise in managing security between the computing systems.

To overcome some of the deficiencies presented in securing network communications between computing systems, various technologies have been developed. These technologies include virtual local area networks (VLANs), encryption for the data payload within the data packets, amongst other similar security procedures. Yet, while the security technologies currently deployed may provide additional security over unprotected networks, management and deploying the security can often be difficult and cumbersome. Further, providing a cohesive inter-computing system security policy may be difficult without modifying the applications on the computing systems, and/or the configurations provided by switches, firewalls, routers, and other similar networking devices providing the connectivity to the computing systems. Difficulties are further compounded when different applications and/or processes executing on a computing system require different qualities of service.

OVERVIEW

The technology disclosed herein enhances inter-computing system communications. In one implementation, a method of operating a communication service on a computing system includes identifying a communication request from an application on the computing system to transfer data to a second application on a second computing system. The method further includes, in response to the communication request, identifying a communication group of a plurality of communication groups associated with the application and the second application, wherein the communication group comprises two or more applications on two or more computing systems. The method also provides identifying a communication quality of service based on the identified communication group, and transferring the data associated with the communication request to the second computing system in accordance with the communication quality of service.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The various examples disclosed herein provide enhancements for managing data communications between computing systems. In particular, computing systems, both real and virtual, include various applications that often require communication with other computing systems to provide desired operations. For example, in an organization's computing network, a service application on a first computing system may require communications with a database on a second computing system. To provide this communication, a network packet may be generated at the first computing system in response to a communication request from the application and the packet may be transferred to the second computing system, wherein the network packet may include a header portion with addressing and protocol information and a payload portion that includes the data for the application.

Here, to improve the security of communications between computing systems, a computing system that is required to communicate with one or more other computing systems may be configured with a communication service that can identify and manage communications with the other computing systems. In a particular example, as a communication request is generated from an application on a computing system, rather than forwarding the communication to the Transmission Control Protocol/Internet Protocol (TCP/IP) portion of the operating system or other software element of the computing system, the packet may be forwarded to a communication service. This communication service, which may operate as part of or alongside the operating system, may determine whether the communication is permitted, and if permitted, configure a network packet for delivery to a second computing system with the data payload for the application and at least private addressing information to secure the communication.

In at least one example, the private addressing information may include at least a source private address for the application and, in some implementations, a destination private address for the destination application, a source port, a destination port, or some other similar private addressing information. In including the private addressing information, applications on the computing system may be provided with their own private or overlay network addressing, permitting the application to communicate with other applications (on supporting computing systems) that share the overlay network. An overlay network is a private network that is built on top of another network (sometimes referred to as an underlay network).

Once the application is allocated to an overlay network, the application may address other applications on the network using the private addressing information associated with the overlay network, wherein the communications are identified at a virtual network interface provided by the communication service. Once the request is received, the service may identify destination information (overlay network destination information) for the requested communication, and determine whether the communication is permitted. Once permitted, the service may identify public addressing information for addressing the destination computing system on the underlay network, and generate a packet that can be transferred to the second computing system. This packet may include an encrypted portion for the application data with the private addressing information (overlay addressing information), and include a non-encrypted portion with the public addressing information (underlay addressing information) and group identifier information for the requesting application.

This group identifier information is used by the destination computing system in determining how to process a received packet. In particular, the group identifier information may include a revision associated with the service, a group corresponding to the requesting application (i.e. an identifier that permits defined applications to communicate), and other relevant information to decrypt the payload of the packet. This information for decrypting the packet may include information about the length of the encrypted data payload, information about the sequence number of the packet, a keyed-hash message authentication code (HMAC), a peer identifier (peerID), an initialization vector (IV) or seed, or some other similar information, including combinations thereof. Based on the group identifier information, the receiving computing system may determine whether the packet is permitted (e.g. whether the packet can be decrypted and supplied to an associated application), or whether the communication should be blocked from being provided to the associated application.

In the present implementation, the group identifier information may be used by the communication services in the computing environment to manage quality of services that are allocated to the communications by each of the computing systems. For example, a computing system may include three applications, wherein each of the applications may be associated with a different communication group. As a result of this configuration, when a communication is requested by one of the applications to communicate data with an application on a second computing system, the service may be used to identify quality of service parameters for the communication based on the group identifier for the applications. These quality of service parameters may define throughput limitations for the communication group, such as a minimum bit rate, a maximum bit rate, or some other similar parameter.

Figure 1:
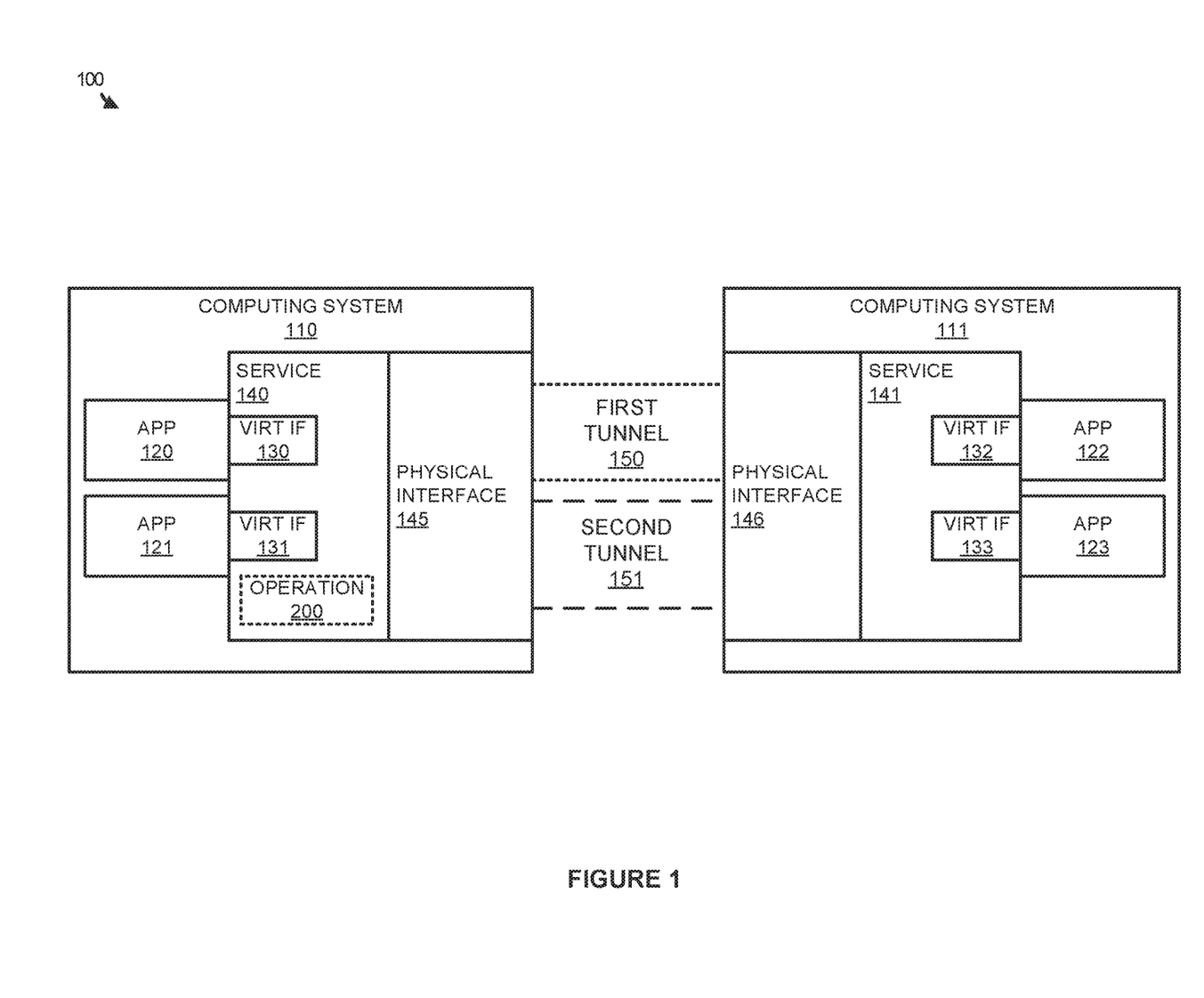
FIG. 1 illustrates a computing network to manage quality of service in inter-computing system communications according to an implementation.

FIG. 1 illustrates a computing network 100 to provide secure communications according to an implementation. Computing network 100 includes computing systems 110-111 that communicate data for applications 120-123 using communication tunnels 150-151, wherein tunnels are 150-151 are each representative of a communication tunnel for a particular communication group. Computing systems 110-111 further includes services 140-141, and physical interfaces 145-146. Service 140 is configured to provide operation 200 that is further described in FIG. 2.

In operation, computing systems 110-111 execute applications 120-123 to provide various operations including data processing, front-end management, image or video editing, productivity, or some other similar type of operation. To permit the applications to communicate with other computing systems and other approved applications, each of the systems includes services 140-141, which are used to identify communications, determine whether the communications are permitted, and generate secure packets for transfer to the destination computing system. In determining whether communications are permitted, computing systems 110-111 may communicate with a configuration service to obtain permissions for the applications on the computing system. In at least one example, a user of the computing system may provide credentials, such as a username and password, which are then provided to the configuration service. In response to the request, the configuration service will identify permissions associated with credentials and provide the permissions to the corresponding service to manage communications on the devices.

In some implementations, the permissions information that is provided by the configuration service may define which computing systems and applications thereon that each computing system may communicate with. As an example, the configuration service may define that application 120 executing on computing system 110 is permitted to communicate with application 123 as part of a first communication group, wherein a communication group includes two or more applications executing across two or more computing systems. As a result, application 120 may use private addressing (overlay addressing) to address the application on the second computing system. This private addressing may be used to segregate applications and/or computing systems into different communication groups. Thus, whereas application 120 and application 123 may belong to the same communication group and share an overlay addressing space, applications 121 and 122 may be a part of a different communication group and share a different overlay addressing space.

In some implementations, applications 120-123 may share the namespace with the other applications on the same computing system. Thus, rather than providing networking for virtual machines or containers, services 140-141 may be used to provide secure networking operations for applications such as gaming applications, productivity applications, database applications, and the like that operate in the same namespace.

Figure 2:
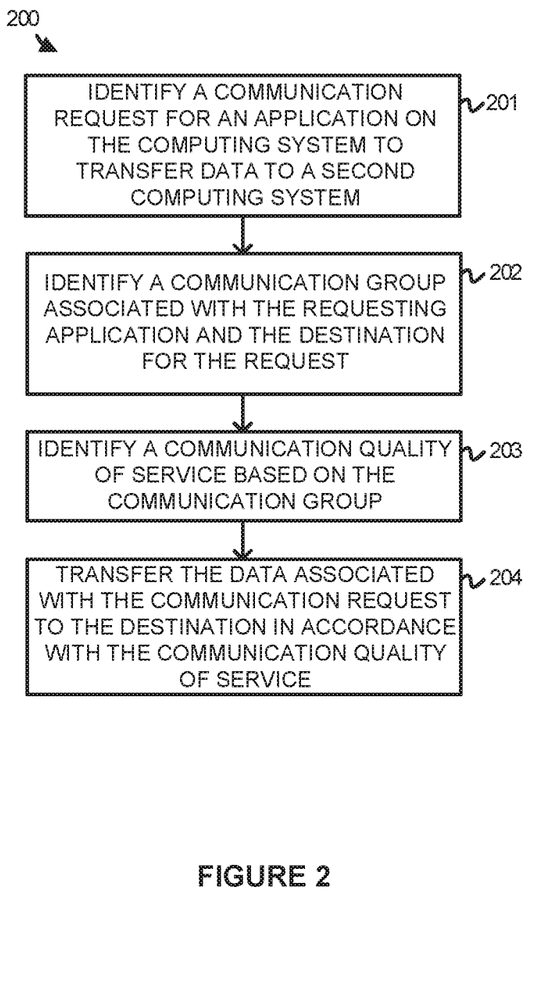
FIG. 2 illustrates an operation of a computing system to provide quality of service for inter-computing system communications according to an implementation.

FIG. 2 illustrates an operation 200 of a computing system to provide quality of service for inter-computing system communications according to an implementation. The processes of operation 200 are referenced parenthetically in the paragraphs that follow with reference to systems and elements of computing network 100 of FIG. 1. Although demonstrated as a communication request on computing system 110, it should be understood that similar operations may be provided by computing system 111.

As described herein, service 140 may request and receive communication permissions from a configuration service, wherein the communication permissions are used in identifying what computing systems and applications are available for communications with computing system 110. Once the permissions are obtained, service 140 identifies (201) a communication request for an application on the computing system to transfer data to a second computing system. In the present implementation, service 140 may be used to provide virtual network interfaces (VIRT IFS) 130-131. In providing these interfaces to the applications, service 140 may act as an intermediary for the applications to generate the required packets to be communicated over the network. In particular, each virtual network interface 130-131 may be allocated overlay or private network addressing information that can be used by the application in communicating with other applications that are part of the overlay network. As an example, application 120 on computing system 110 may be provided with a first private address and application 123 on computing system 110 may be provided with a second private address as part of the same overlay network (communication group).

After a communication request is received at service 140, service 140 identifies (202) a communication group associated with the requesting application and the destination application for the request. For example, applications 120 and 122 may correspond to a first communication group, while applications 121 and 123 correspond to a second communication group. As a result, if application 120 were permitted to communicate with application 122, application 120 may provide private addressing information for application 122 that is identified by service 120. Based on the addressing provided for application 122, along with the source private address associated with application 120, service 140 may determine a group identifier associated with applications 120 and 123. Once the group identifier is determined, operation 200 further identifies (203) a communication quality of service based on the identified communication group, and transfers (204) the data associated with the communication request to the destination in accordance with the communication quality of service. In transferring the data to the destination, service 140 may be responsible for generating one or more secure packets for the communication, wherein each secure packet includes an encrypted payload portion, a non-encrypted group identifier portion, and a non-encrypted addressing portion.

First, the encrypted payload is used to encrypt the data for the application along with the private addressing (overlay addressing) information for the application. This encryption may be provided in some examples using the permissions information provided from the configuration service. In particular, credentials or certificates may be provided with the permissions that are used to encrypt data for applications in the same communication group. Thus, when a communication is required, the private addressing information for the communication may be appended to the data of the application and, together, the data and addressing information may be encrypted using the associated encryption credentials. In some implementations, the encryption certificates provided by the configuration service may be different for each communication group. Thus, if application 120 and application 123 were in a first group, while applications 121-122 were in a second group, the first group may use different encryption mechanisms than the second group of applications.

Second, in addition to the encrypted portion of the packet, the non-encrypted portion of the packet may include group identifier information. This group identifier information is used in defining what communication group the communication belongs, as well as supplemental information that can be used in decrypting the packet. In some implementations, the group identifier information may include information about the length of the data payload, information about the sequence number of the packet, a keyed-hash message authentication code (HMAC), a peer identifier (peerID), an initialization vector (IV) or seed, or some other similar information, including combinations thereof. As an example, application 120 on computing system 110 may belong to a first communication group with a first group identifier, while application 121 may belong to a second communication group with a second group identifier. In this manner, the group identifiers may be used to notify the receiving computing system of which encryption credentials or certificates should be used in decrypting the payload, as well as the source of the communication. Additionally, the supplemental information (described above) may be used in providing any of the additional information required to decrypt the packet.

Finally, the third portion of the packet, includes the public network addressing or underlay network information, wherein the underlay network provides a platform for multiple overlay networks to operate on top of the addressing of the underlay network. This includes the public IP address for computing system 110 the public addressing information for computing system 111, port information for the communication and the like. As a result, although a single IP address may be allocated to the computing systems physical interface 145 (the underlay network address), the applications executing thereon may interact with other systems and applications using different addresses (addresses associated with the overlay network(s)). In some implementations, the public addressing information may be supplied as permission information from the configuration service, wherein service 140 can associate the underlay addressing required from a communication request using the overlay or private addressing.

In some implementations, in providing the quality of service for communications, the quality of service for a particular communication group may be associated with a minimum bit rate, wherein each of the communication groups may be associated with a minimum bitrate in uplink and downlink communications with other applications of the same communication group. As a result of this configuration, if one communication group is impeding another communication group from receiving the adequate bit rate, then service 140 may be responsible for throttling the communications from the communication group that is using too many resources.

In some examples, multiple applications on the same computing system may be part of the same communication group. Consequently, the resources for the applications may be aggregated when applied to the group quality of service. For example, if applications 120-121 were part of a first communication group, then the communications of both applications 120-121 may be provided in accordance with the single shared quality of service for the applications. As a result, service 140 may be responsible for limiting or throttling the communications of application 120 and/or application 121 to ensure that the applications stay within the allocated quality of service for the communication group.

Although demonstrated in the example if FIG. 1 using two computing systems, it should be understood that a communication network may include any number of computing systems with communication services executing thereon. These communication services may include different quality of service parameters based on a variety of factors for each of the computing systems. These factors may include physical network constraints for the computing systems, the types of applications and or communication groups that are associated with the computing system, or any other similar factor, including combinations there. In some examples, when configuring the service on the computing system, the configuration service may identify relevant traits of the computing system (physical network constraints and/or the various communication groups for the computing system), and generate a quality of service based on the traits of the computing system. Thus, a computing system with a fast network connection and a single communication group may provide a higher quality of service to the single communication group than a second computing system with a slower network connection and multiple communication groups.

Figure 3:
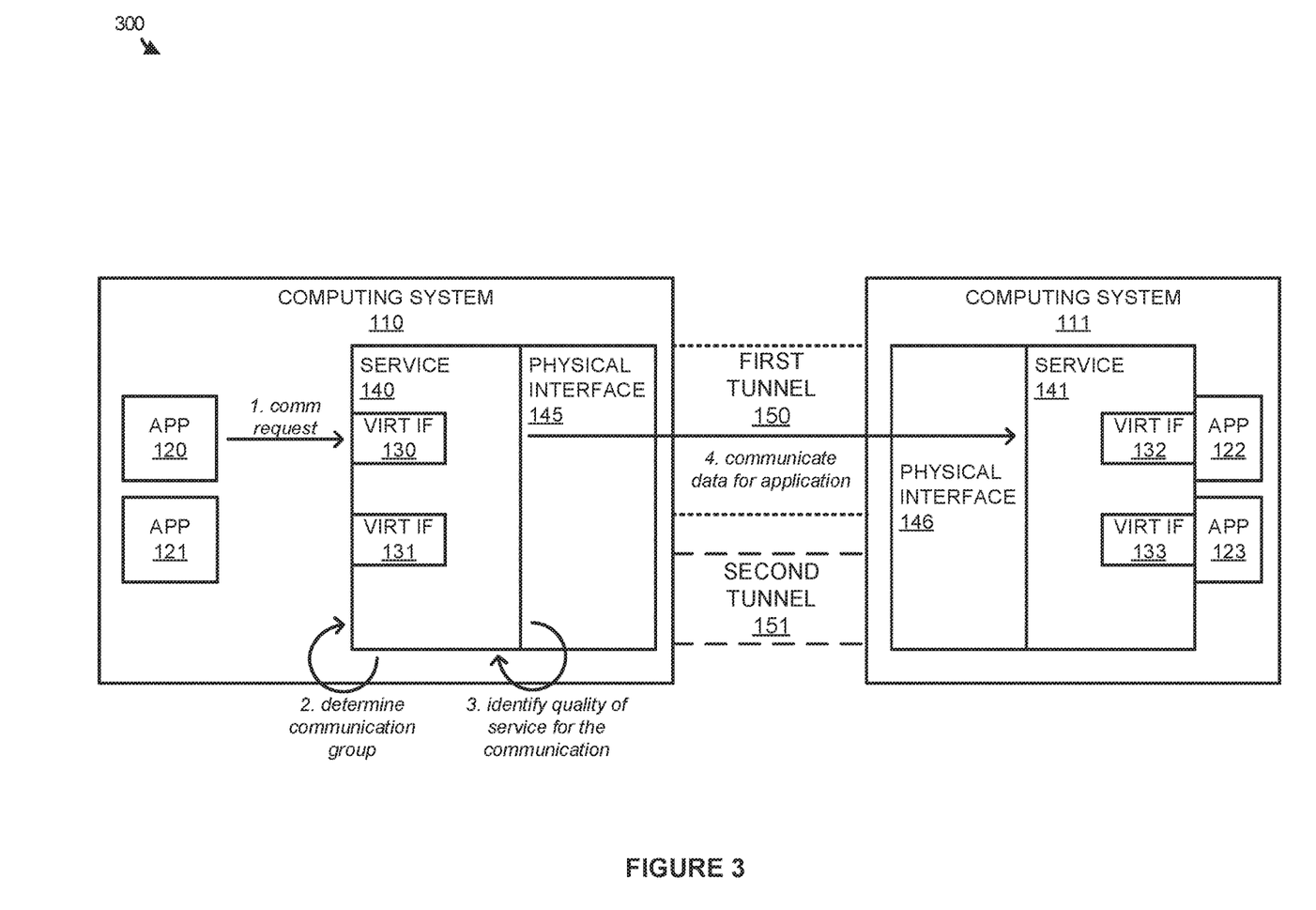
FIG. 3 illustrates an operational scenario of an inter-computing system communication according to an implementation.

FIG. 3 illustrates an operational scenario 300 of an inter-computing system communication according to an implementation. Operational scenario 300 includes systems and elements from computing network 100 of FIG. 1.

Figure 4:
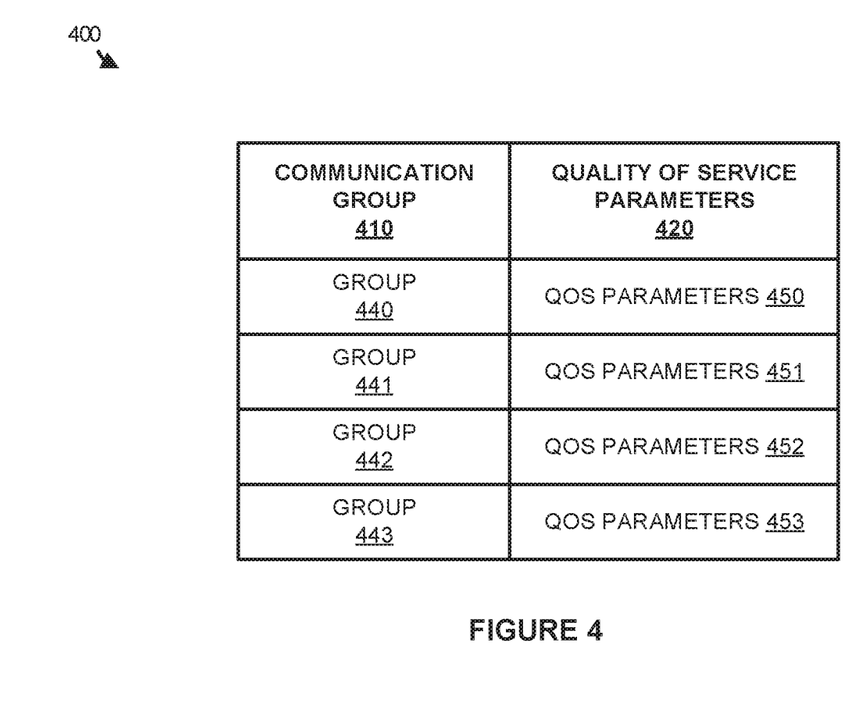
FIG. 4 illustrates a data structure for managing quality of service for inter-computing system communications according to an implementation.

As depicted, application 120 initiates a communication request, at step 1, with a private destination address, wherein the private destination address corresponds to a second application that shares an overlay network with application 120. In the example of FIG. 4, application 120 provides a private destination address that corresponds to application 122 on computing system 111. In response to identifying the communication, service 140 may, at step 2, determine a communication group for the communication, and identify a quality of service for the communication at step 3. In identifying the communication group associated with the request, service 140 may be configured by a configuration service that defines which remote applications (and corresponding computing systems) each of the applications on computing system 110 can communicate with. This configuration may include private or overlay addressing information for each of the applications, such that when an application attempts to communicate with another application on another computing system, the application may use a private address associated with the destination application. Once a communication request is generated, service 140 identifies the request, wherein the service 140 may operate as part of or alongside the operating system for computing system 110. After identifying the request, service 140 may determine a communication group for the communication based on attributes (source/destination addressing information) in the request, and determine a communication group based on the attributes.

In some implementations, the quality of service information may define bit rate parameters for communications by applications associated with a particular communication group (maximum or minimum bit rate). For example, a first communication group may have a first minimum bitrate, while a second communication group may have a second minimum bitrate. In this manner, when a communication is requested, service 140 may identify the request, and support the request in such a manner as to ensure that each of the application groups obtains an adequate quality of service.

Once a quality of service is defined for the communication, the data for the application is a communicated, at step 4, in accordance with the defined quality of service. Thus, the data for application 120 may be communicated to computing system 111 as one or more encrypted packets as further described above in FIG. 2, as well as below in FIGS. 5 and 6, wherein the packet includes a non-encrypted public (or underlay) addressing header, non-encrypted group identifier information, and an encrypted portion for the private addressing information and application data. After the packet is received, computing system 111 may process the packet using service 141, and forward the packet to the corresponding application. In some implementations, the processing of the packet may include using the group identifier information to decrypt the data packet, and provide the application data to the appropriate application.

FIG. 4 illustrates a data structure 400 for managing quality of service for inter-computing system communications according to an implementation. Data structure 400 includes columns defining communication groups 410 and quality of service parameters 420. The column for communication groups 410 includes groups 440-443, and the column for quality of service parameters 420 includes quality of service (QOS) parameters 450-453.

As described herein, communication services may be maintained that operate as part of or alongside the operating system of a computing system. In particular, when an application requests a communication, the communication service may intercept the communication and determine a communication group for the communication, wherein communication groups comprise two or more applications executing over two or more computing systems. In determining the communication group, the communication service may identify various attributes within the communication request from the application to identify the appropriate group for the communication. These attributes may include the destination private IP address for the communication, a source IP address that is associated with the application, or some other similar communication parameter identified from the request. Once the group is identified, the communication service may identify QOS parameters that correspond to the group, and communicate the data in accordance with the parameters.

As an illustrative example, a computing system may identify a communication request from an application. In response to the communication request, the communication service will determine a group associated with the request, such as group 441. Once the group is identified, data structure 400 may be used to identify the QOS parameters for the communication, and the communication may be transferred to the destination computing system in accordance with the parameters. In some implementations, the packets for the communication may be transferred as secure data packets as further described in FIGS. 5-6, wherein the packets may include group identifier information to identify the communication group associated with the communication.

Figure 5:
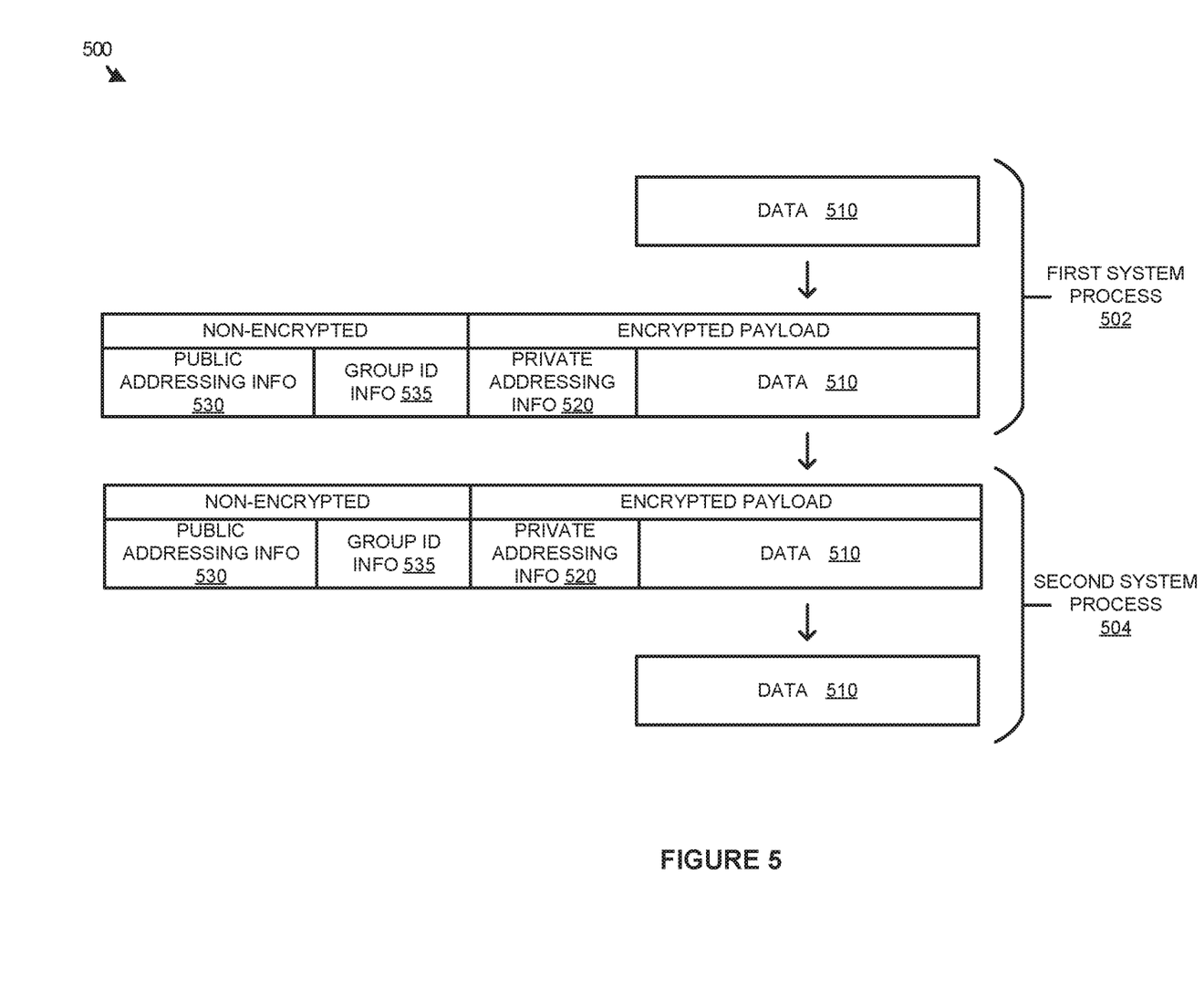
FIG. 5 illustrates an overview of packet management to provide secure packet communication according to an implementation.

FIG. 5 illustrates an overview 500 of packet management to provide secure packet communication according to an implementation. Overview 500 includes first system process 502 that is representative of operations that may be provided on a first computing system, such as computing system 110, and second system process 504 that is representative of operations that may be provided on a receiving computing system, such as computing system 111. Overview 500 further includes data 510, private addressing information 520, group identifier (ID) information 535, and public addressing information 530.

In the present implementation, when an application requires a communication, the application may provide data 510, which is identified by a communication service executing on the computing system. In particular, the application may be allocated to a communication group, wherein the communication group may communicate via an overlay addressing scheme with other applications and computing systems allocated to the communication group. For example, in an organization, finance applications may be configured such that they can communicate with one or more computing systems that also belong to the finance group.

Once a communication request is received with the application data, the communication service may process the request to generate a data packet to support the communication request. In some examples, the application may provide private addressing information associated with the private network or overlay network associated with the application. Based on the private addressing information, the communication service may determine if the communication is permitted and generate the packet with private addressing information 520 (provided at least in part from the application), group ID information 535 and public addressing information 530. Private addressing information 520 may include private source and destination IP addresses, private source and destination ports, a communication protocol, or some other similar information for the data packet. Group identifier information 535 may include various information that can be used in verifying and decrypting the packet. In some examples, this information may include a group identifier associated with the communication group for the application, a service version identifier associated with the communication service, as well as other attributes associated with the encrypted portion of packet. Public addressing information 530, which is also included in the non-encrypted portion of the packet is also used in routing the communication between computing systems. In particular, the public addressing information may include source and destination IP addresses associated with an underlay network connection for the computing systems (e.g. the addresses allocated to physical interfaces 145-146), the ports that the services communicate over, and a protocol for the communication. These addresses and ports are different than the private addresses that are used by the applications on the computing system.

Once the packet is generated and transferred to the receiving computing system, the receiving computing system and the communication service process the packet to extract the data from the packet. To provide this operation, the service will inspect group identifier information to determine how to decrypt the packet, and extract data 510 from the packet. In some implementations, to provide this decryption operation, the service may identify traits within the group identifier information, such as the group identifier, the service type, and the length of the packet. The decrypted data may then be provided to the required application.

In some implementations, in transferring the secure data packets between computing systems, the transferring communication service (the service associated with first system process 502) may be used to identify a quality of service based on the group identifier. In particular, different groups of a communication network may be allocated a different quality of service, wherein the quality of service may limit and/or ensure that a group is being provided with an adequate bit rate for communications. In some examples, multiple applications on a computing system may belong to a communication group. As a result, the bit rate for the applications may be aggregated in determining how to communicate traffic between computing systems in accordance with the defined quality of service.

In some examples, in configuring the computing systems and services for the quality of service, the computing systems may communicate with a configuration service, wherein the configuration service may define the applications that belong to which communication group and the quality of service for the communications. In defining the quality of service parameters for each of the groups and each of the computing systems, the configuration service may identify each of the groups that operate on the computing system, as well as determine any physical network characteristics of the computing system. Based on this information, the configuration service may determine quality of service parameters that can be applied to the specific computing system.

Figure 6:
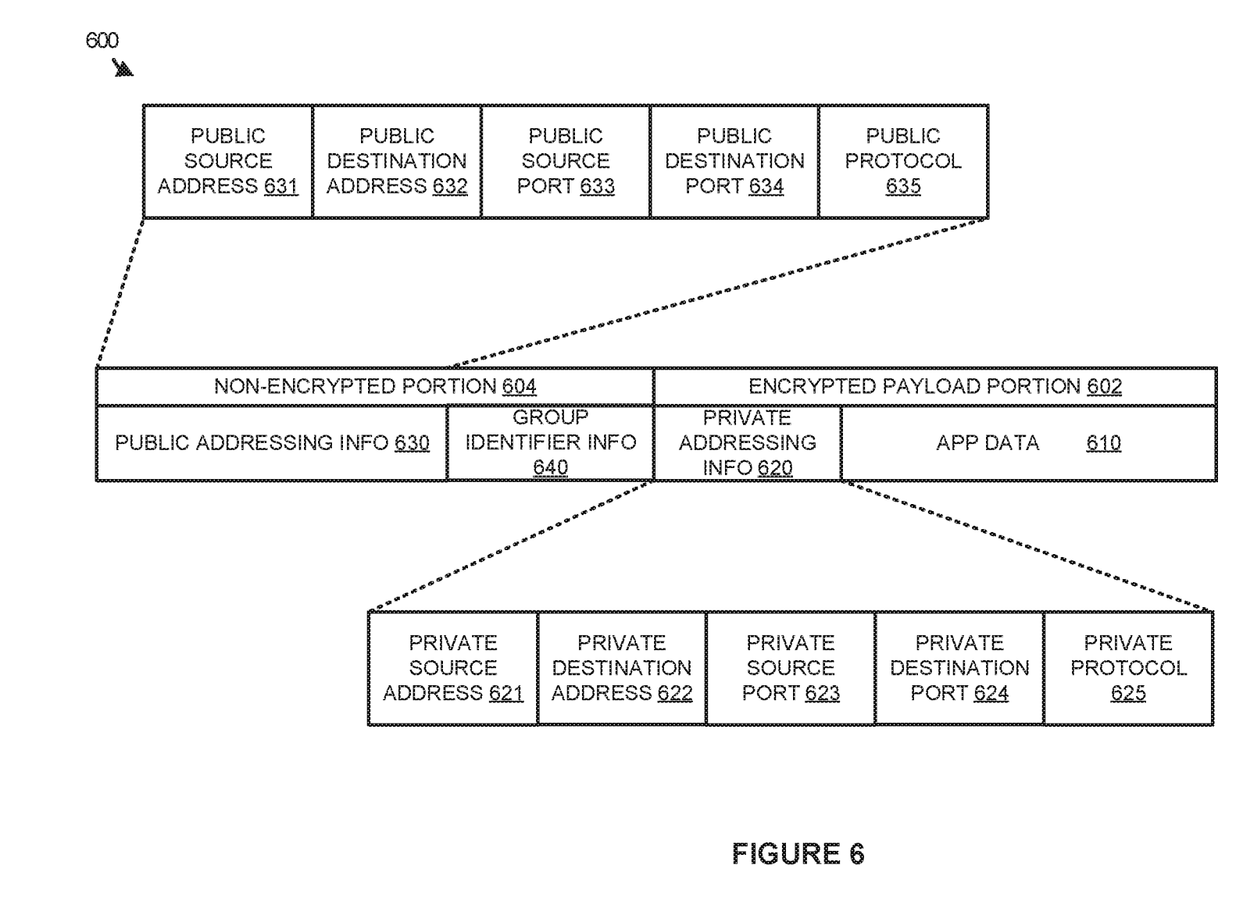
FIG. 6 illustrates a secured network packet according to an implementation.

FIG. 6 illustrates a secured network packet 600 according to an implementation. Network packet 600 includes an encrypted payload portion 602 and a non-encrypted portion 604. Encrypted payload portion includes application data 610 and private addressing information 620, while non-encrypted portion 604 includes group identifier information 640 and public addressing information 630.

As described herein, a communication service that operates as part of or alongside the operating system of a computing system, will identify a communication request for an application. Once identified and the communication is permitted, the communication service may generate network packet 600 using permissions information (addressing and encryption parameters) provided by a configuration system. In the present example, the communication includes the application data 610, which corresponds to the data requested to be transmitted by the application, private addressing information 620 that is used as overlay addressing for the application in communicating with other applications and computing systems that are part of the overlay network, group identifier information 640, which is used in decrypting and providing security information for the packet, and public addressing information 630, which is used in the routing of the communications on the underlay communication network.

First, with respect to private addressing information 620, private addressing information 620 comprises addressing that is allocated to applications on a computing system by a configuration service. For example, the configuration service may be used to allocate financial client computing system applications with access to communicate with a financial database application on a separate computing system. In allocating these permissions, the configuration system may assign the computing systems (and associated applications) private addressing information to join the private overlay network. Here, when an application attempts to communicate with a second application on another computing system, the private addressing will include private source address 621 associated with the source application, destination address 622 associated with the destination application, private source port 623 associated with the source application, private destination port 624 associated with the destination application, and a private protocol 625 that is used by the communication between the applications.

Second, packet 600 includes group identifier information 640, which is used by the destination computing system to identify group (overlay network) associated with the packet, and decrypt information for decrypting the packet. This information may include information about the length of the data payload, information about the sequence number of the packet, a keyed-hash message authentication code (HMAC), a peer identifier (peerID), an initialization vector (IV) or seed for encryption, or some other similar information, including combinations thereof.

Third, packet 600 includes public addressing information 630, which is used in the overlay network to direct the packet to the destination computing system. In particular, public addressing information 630 includes at least public source address 631 corresponding to the source computing system, public destination address 632 corresponding to the destination computing system, public source port 633 corresponding to a port that is used by the source computing system for the communication service in general, public destination port 634 corresponding to a port that is used by the destination computing system for the communication service in general, and public protocol 635 that corresponds to a user datagram protocol for communicating between computing systems. It should be understood that the information in public addressing information 630 differs from that used in private addressing information 620.

In some implementations, such as the examples described herein, the group identifier within group identifier information 640 may be used in defining a quality of service for the communication between computing systems. For example, when the group identifier is identified for the communication, the communication service may determine a maximum or minimum bit rate that corresponds to the communications. As a result, as the data is transferred the communication service may meter or transfer the communications in accordance with the quality of service as well as the communication load for the computing system. As an illustrative example, if two applications on the computing system correspond to a first communication group and two or more other applications on the computing system correspond to the second computing system. Each of the communication groups will be provided with an associated quality of service that is shared between applications that correspond to the communication group. To provide the adequate quality of service, parameters may be defined within the packet that define an IP type of service (IP TOS), differentiated services (DiffServ) information, or some other similar parameter within the packet, including combinations thereof.

Figure 7:
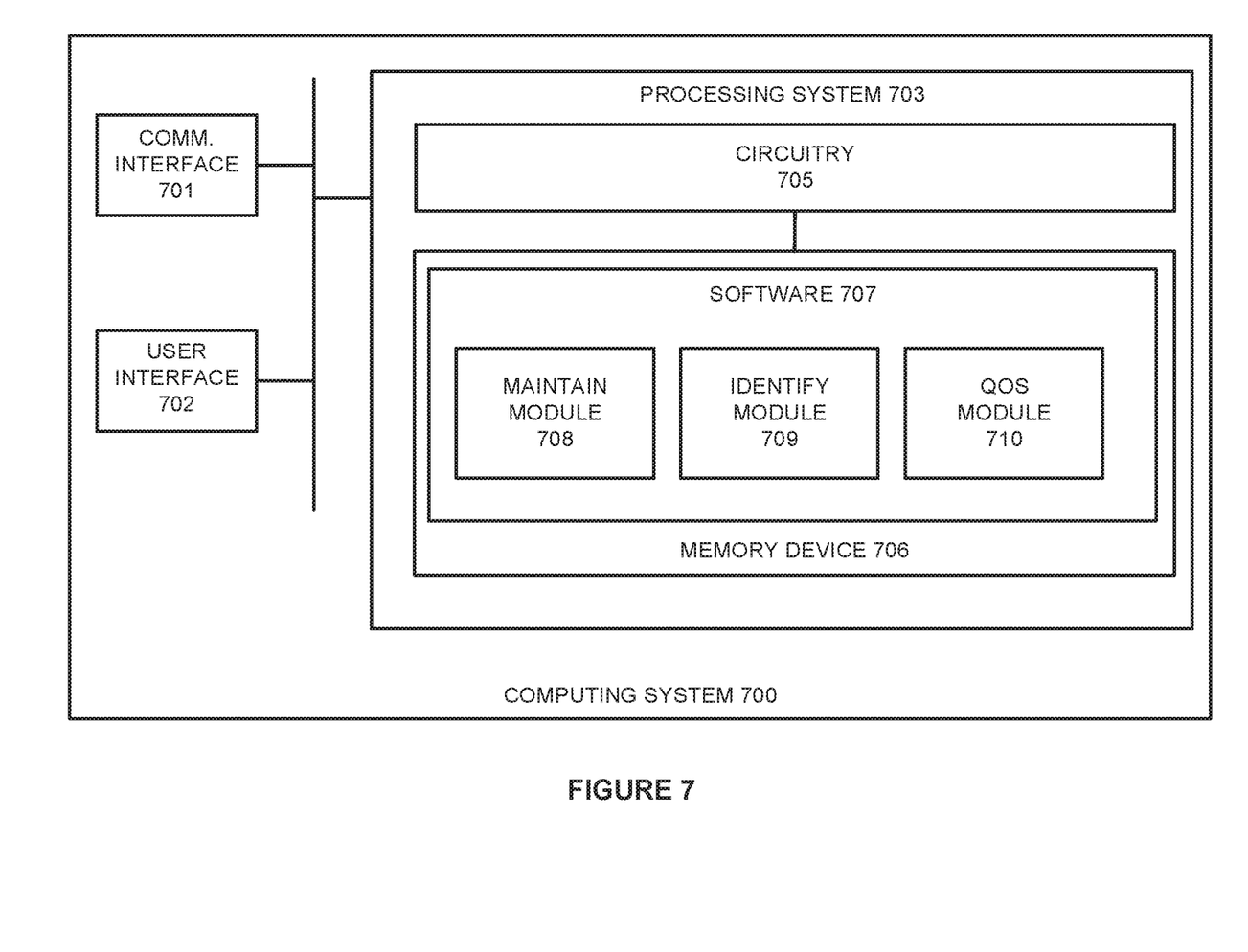
FIG. 7 illustrates a computing system capable of secure data communications according to an implementation.

FIG. 7 illustrates a computing system 700 capable of secure data communications according to an implementation. Computing system 700 is representative of any computing system or systems with which the various operational architectures, processes, scenarios, and sequences disclosed herein for a computing system with a communication service can be implemented. Computing system 700 is an example of computing systems 110-111, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate with other end computing systems and a configuration system as described herein.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes maintain module 708, identify module 709, and quality of service (QOS) module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In operation, maintain module 708 directs processing system 703 to maintain group identifier and permission information for communications with other computing systems. In maintaining the information, computing system 700 may obtain permissions and group identifier information from a configuration service. This permissions and group identifier information may define which applications are permitted to communicate with other applications on other computing systems. For example, computing system 700 may include three applications, wherein two applications correspond to a first communication group and the third application corresponds to a second communication group. Based on the communication group, each of the applications may communicate with applications on other computing systems in accordance with a quality of service associated with the group.

While maintaining the communication group information, identify module 709 directs processing system 703 to identify a communication request from an application on the computing system. In response to the request, identify module 709 identifies a communication group associated with the requesting application and the destination application, and QOS module 710 identifies a quality of service for the communication group. Once the quality of service is identified, QOS module 710 communicates the data for the communication request in accordance with the quality of service. This may include generating one or more secure packets as described herein in FIGS. 1-6. In some examples, to provide the adequate quality of service, parameters may be defined within the packet that define an IP type of service (IP TOS), differentiated services (DiffServ) information, or some other similar parameter within the packet, including combinations thereof.

Returning to the elements of FIG. 1, computing systems 110-111 may each comprise communication interfaces, network interfaces, processing systems, computer systems, microprocessors, storage systems, storage media, or some other processing devices or software systems, and can be distributed among multiple devices. Computing systems 110-111 can each include software such as an operating system, logs, databases, utilities, drivers, natural language processing software, networking software, and other software stored on a computer-readable medium. Computing systems 110-111 may each comprise a serving computing system, a desktop computing system, or some other similar computing system. In some implementations, computing systems 110-111 may also represent virtual machines executing various applications. As a result, in some implementations, rather than physical network interfaces, the network interfaces may comprise virtual network interfaces for the virtual machine.

Communication between computing systems 110-111 may use metal, glass, optical, air, space, or some other material as the transport media. Communication between computing systems 110-111 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing systems 110-111 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented system for controlling intercommunication between at least a first computing system and a second computing system, in line with predetermined Quality of Service (QoS) parameters, said system comprising: at least one processor; at least one memory module storing computer program code and communicably coupled to said processor, and wherein said memory module and said computer program code are configured, with said processor, to cause said computer-implemented system to: identify computer-based applications executed on said first computing system and said second computing system respectively; cluster said computer-based applications executed on said first computing system and said second computing system, into a first communication group and a second communication group respectively, based on a predetermined grouping criterion, and wherein clustering of said computer-based applications into said first communication group and said second communication group: defines at least encryption credentials usable specifically for communications outbound from each of said first communication group and said second communication group; and defines decryption information usable specifically for decrypting communications inbound to each of said first communication group and said second communication group; and wherein each of the outbound and the inbound communications include an encrypted portion and a non-encrypted portion; assign predetermined Quality of Service parameters to said first communication group and said second communication group, based at least on historical operational information corresponding to said first computing system and said second computing system respectively, and apply said Quality of Service parameters to each of said computer-based applications clustered into said first communication group and said second communication group respectively; trigger said computer-based applications clustered into said first communication group to selectively communicate with said computer-based applications clustered into said second communication group, in line with said Quality of Service parameters assigned to said first communication group; trigger said computer-based applications clustered into said second communication group to selectively communicate with said computer-based applications clustered into said first communication group, in line with said Quality of Service parameters assigned to said second communication group; and wherein said processor further causes said computer-implemented system to selectively calibrate said intercommunication between said computer-based applications clustered into said first communication group and said computer-based applications clustered into said second communication group, such that said computer-based applications clustered into said first communication group continually adhere to said Quality of Service parameters assigned to said first communication group, and said computer-based applications clustered into said second communication group continually adhere to said Quality of Service parameters assigned to said second communication group.

2. The system as claimed in claim 1, wherein said Quality of Service parameters are selected from a group of parameters consisting of a minimum bitrate in an uplink communication, a minimum bitrate in a downlink communication, a maximum bitrate in said uplink communication, and a maximum bitrate in said downlink communication.

3. The system as claimed in claim 1, wherein said computer-based applications clustered into said first communication group selectively intercommunicate with said computer-based applications clustered into said second communication group, via an overlay network.

4. The system as claimed in claim 3, wherein said computer-based applications clustered into said first communication group and said computer-based applications clustered into said second communication group selectively intercommunicate through an exchange of data packets via said overlay network.

5. The system as claimed in claim 4, wherein each of said data packets transmitted from said computer-based applications clustered into said first communication group and said computer-based applications clustered into said second communication group, include the encrypted portion and the non-encrypted portion, and wherein said encrypted portion incorporates private addressing information including a private source address referencing a source of each of said data packets on said overlay network, a private destination address referencing a destination for each of said data packets on said overlay network, a private source port number and a private destination port number, and wherein said first communication group is identified via a first group identifier and said second communication group is identified via a second group identifier.

6. The system as claimed in claim 5, wherein said non-encrypted portion of each of said data packets incorporates public addressing information, said public addressing information specifying a public source IP address referencing a source of each of said data packets on a public network underlying said overlay network, a public destination IP address referencing a destination for each of said data packets on said public network, a public source port number, and a public destination port number.

7. The system as claimed in claim 5, wherein said non-encrypted portion of each of said data packets further incorporates group identifier information, said group identifier information specifying one of said first communication group and said second communication group as said source for each of said data packets, said group identifier information further identifying at least a length of said encrypted portion of each of said data packets, a sequence number of each of said data packets, and a peerID for each of said data packets.

8. A computer-implemented method for controlling intercommunication between at least a first computing system and a second computing system, in line with predetermined Quality of Service (QoS) parameters, said method comprising the following computer-implemented steps: identifying computer-based applications executed on said first computing and said second computing system respectively; clustering said computer-based applications executed on said first computing system and said second computing system, into a first communication group and a second communication group respectively, based on a predetermined grouping criterion, thereby defining at least: encryption credentials usable specifically for communications outbound from each of said first communication group and said second communication group; and decryption information usable specifically for decrypting communications inbound to each of said first communication group and said second communication group; and wherein each of the outbound and the inbound communications include an encrypted portion and a non-encrypted portion; assigning predetermined Quality of Service (QoS) parameters to said first communication group and said second communication group, based at least on historical operational information corresponding to said first computing system and said second computing system respectively, and applying said Quality of Service parameters to each of said computer-based applications clustered into said first communication group and said second communication group respectively; triggering said computer-based applications clustered into said first communication group to selectively communicate with said computer-based applications clustered into said second communication group, in line with said Quality of Service parameters assigned to said first communication group; triggering said computer-based applications clustered into said second communication group to selectively communicate with said computer-based applications clustered into said first communication group, in line with said Quality of Service parameters assigned to said second communication group; and wherein said processor further causes said computer-implemented system to selectively calibrate said intercommunication between said computer-based applications clustered into said first communication group and said computer-based applications clustered into said second communication group, such that said computer-based applications clustered into said first communication group continually adhere to said Quality of Service parameters assigned to said first communication group and said computer-based applications clustered into said second communication group continually adhere to said Quality of Service parameters assigned to said second communication group.

9. The method as claimed in claim 8, wherein the method includes the step of establishing an overlay network preconfigured to enable said intercommunication between said computer-based applications clustered into said first communication group and said computer-based applications clustered into said second communication group.

10. The method as claimed in claim 9, wherein the method further includes the step of enabling a selective exchange of data packets between said computer-based applications clustered into said first communication group and said computer-based applications clustered into said second communication group, via said overlay network.

11. The method as claimed in claim 10, wherein the method further includes the following steps: bifurcating each of said data packets into the encrypted portion and the non-encrypted portion, wherein said encrypted portion incorporates private addressing information including a private source address referencing a source of each of said data packets on said overlay network, a private destination address referencing a destination for each of said data packets on said overlay network, a private source port number and a private destination port number, and wherein said first communication group is identified via a first group identifier and said second communication group is identified via a second group identifier.

12. The method as claimed in claim 11, wherein the method further includes the step of embedding into said non-encrypted portion of each of said data packets, public addressing information including a public source IP address referencing a source of each of said data packets on a public network underlying said overlay network, a public destination IP address referencing a destination for each of said data packets on said public network, a public source port number, and a public destination port number.

13. The method as claimed in claim 11, wherein the method further includes the step of further embedding said non-encrypted portion of each of said data packets with group identifier information, said group identifier information specifying one of said first communication group and said second communication group as said source for each of said data packets, said group identifier information further identifying at least a length of said encrypted portion of each of said data packets, a sequence number of each of said data packets, and a peerID for each of said data packets.

14. A non-transitory computer-readable storage medium having computer-readable instructions stored thereon, said computer-readable instructions, when executed by a computer-based processor cause said processor to: identify computer-based applications executed on said first computing and said second computing system respectively; cluster said computer-based applications executed on said first computing system and said second computing system, into a first communication group and a second communication group respectively, based on a predetermined grouping criterion, and wherein clustering of said computer-based applications into said first communication group and said second communication group defines at least: encryption credentials usable specifically for communications outbound from each of said first communication group and said second communication group; and defines decryption information usable specifically for decrypting communications inbound to each of said first communication group and said second communication group; and wherein each of the outbound and the inbound communications include an encrypted portion and a non-encrypted portion; assign predetermined Quality of Service parameters to said first communication group and said second communication group, based at least on historical operational information corresponding to said first computing system and said second computing system respectively, and apply said Quality of Service parameters to each of said computer-based applications clustered into said first communication group and said second communication group respectively; trigger said computer-based applications clustered into said first communication group to selectively communicate with said computer-based applications clustered into said second communication group, in line with said Quality of Service parameters assigned to said first communication group; trigger said computer-based applications clustered into said second communication group to selectively communicate with said computer-based applications clustered into said first communication group, in line with said Quality of Service parameters assigned to said second communication group; and selectively calibrate said intercommunication between said computer-based applications clustered into said first communication group and said computer-based applications clustered into said second communication group, such that said computer-based applications clustered into said first communication group continually adhere to said Quality of Service parameters assigned to said first communication group, and said computer-based applications clustered into said second communication group continually adhere to said Quality of Service parameters assigned to said second communication group.

15. The computer-readable instructions as claimed in claim 14, wherein said instructions, when executed by said processor, further cause said processor to: establish an overlay network preconfigured to enable said intercommunication between said computer-based applications clustered into said first communication group and said computer-based applications clustered into said second communication group; trigger a selective exchange of data packets between said computer-based applications clustered into said first communication group and said computer-based applications clustered into said second communication group, via said overlay network; bifurcate each of said data packets into an encrypted portion and a non-encrypted portion, wherein said encrypted portion incorporates private addressing information including a private source address referencing a source of each of said data packets on said overlay network, a private destination address referencing a destination for each of said data packets on said overlay network, a private source port number and a private destination port number, and wherein said first communication group is identified via a first group identifier and said second communication group is identified via a second group identifier; embed said non-encrypted portion of each of said data packets with public addressing information including a public source IP address referencing a source of each of said data packets on a public network underlying said overlay network, a public destination IP address referencing a destination for each of said data packets on said public network, a public source port number, and a public destination port number; further embed said non-encrypted portion of each of said data packets with group identifier information, said group identifier information specifying one of said first communication group and said second communication group as said source for each of said data packets, said group identifier information further identifying at least a length of said encrypted portion of each of said data packets, a sequence number of each of said data packets, and a peerID for each of said data packets.

* * * * *